United States Patent
Alten

[15] 3,683,572
[45] Aug. 15, 1972

[54] SEALING DEVICE FOR OPENINGS IN BUILDINGS

[72] Inventor: Kurt Alten, Ringstr. 14, 3015 Wennigsen am Deister, Germany

[22] Filed: April 28, 1970

[21] Appl. No.: 32,603

[52] U.S. Cl. .......................52/173, 52/204, 160/332
[51] Int. Cl. ...............................................E06b 7/23
[58] Field of Search ..52/173, 204; 160/332; 135/5 A

[56] References Cited

UNITED STATES PATENTS

| | | | |
|---|---|---|---|
| 3,557,508 | 1/1971 | Frommelt et al. | 135/5 A |
| 3,592,256 | 7/1971 | Knight | 160/332 |
| 3,403,489 | 10/1968 | Frommelt | 52/204 |
| 3,249,150 | 5/1966 | Knight | 160/332 |
| 3,473,272 | 10/1969 | Hasselquist | 52/222 |
| 2,766,764 | 10/1956 | Bennett | 134/72 |
| 3,181,205 | 5/1965 | Frommelt | 52/173 |
| 3,254,625 | 6/1966 | Fox et al. | 160/332 |
| 3,375,625 | 4/1968 | Edkins et al. | 52/204 |
| 3,461,627 | 8/1969 | Conger | 52/173 |
| 3,500,599 | 3/1970 | Sciolino | 52/173 |

FOREIGN PATENTS OR APPLICATIONS

| | | | |
|---|---|---|---|
| 1,248,270 | 8/1967 | Germany | 52/63 |
| 1,226,627 | 10/1966 | Germany | 52/63 |
| 1,508,336 | 11/1967 | France | 52/63 |
| 73,146 | 7/1928 | Sweden | 135/5 A |

Primary Examiner—Frank L. Abbott
Assistant Examiner—Leslie A. Braun
Attorney—Walter Becker

[57] ABSTRACT

A sealing arrangement for openings in buildings for sealing the gap between the wall portions defining said opening and an object in or in front of said opening, which includes a plurality of substantially parallel flexible elastic strips located in at least one plane substantially parallel to the plane defined by said opening and adapted to yield and sealingly engage an object moved into or toward said opening.

12 Claims, 7 Drawing Figures

PATENTED AUG 15 1972　　3,683,572

INVENTOR
Kurt Allen
BY
[signature]

SEALING DEVICE FOR OPENINGS IN BUILDINGS

The present invention relates to a seal for buildings for sealing the gap between the marginal portions of openings in buildings and the like and an object, for instance a vehicle with a box-like superstructure, located in front of or within such opening. However, the invention is not limited to this specific application but may also be used as seal for any other opening in a building, for instance, as a door-like opening.

It is an object of the present invention to provide a durable seal of simple construction, in which the danger of damaging the seal itself or the object surrounded by the seal will be avoided.

It is another object of this invention to provide a seal of the above mentioned general character which will assure a good seal also when the size of the opening greatly differs from the size of the object to be surrounded by the seal or vice versa.

These and other objects and advantages of the invention will appear more clearly from the following specification in connection with the accompanying drawing, in which:

FIG. 1 diagrammatically illustrates a vertical central section through an elastic seal according to the invention between a building and a vehicle parked in front of an opening in the building.

Figure 4:
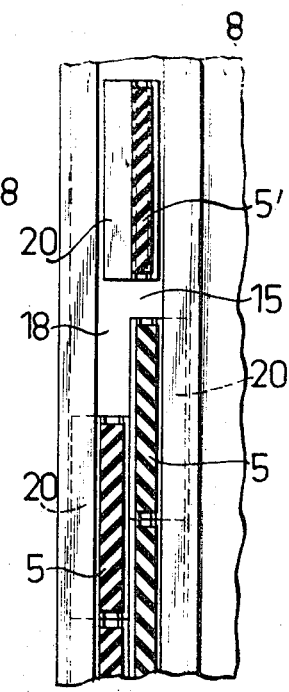
Figure 3:
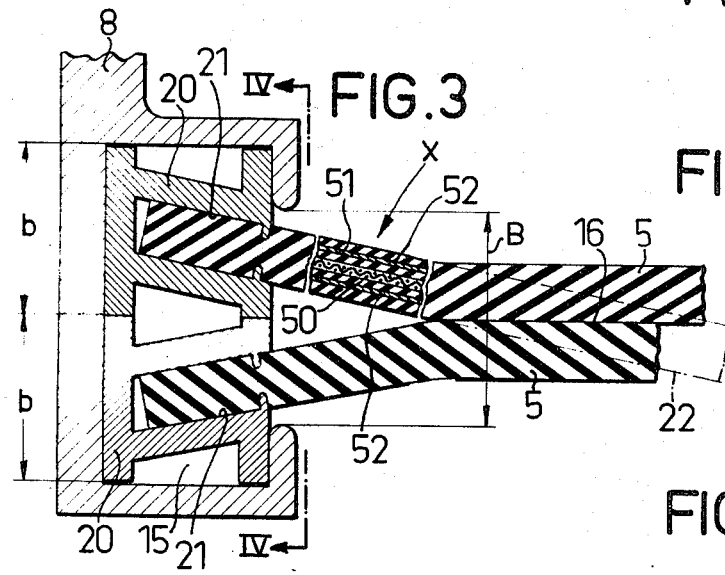
FIG. 3 represents a section taken along the line III—III of FIG. 2.

FIG. 4. is a section taken along the line IV—IV of FIG. 3.

Figure 5:
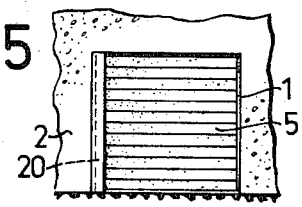

FIG. 5 illustrates a modified arrangement of the lamellae-like strips of the seal according to the invention, in which the strips are arranged horizontally.

Figure 6:
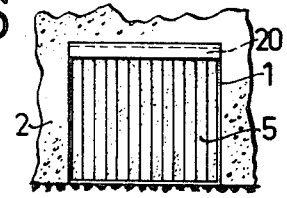

FIG. 6 differs from FIG. 5 primarily in that the strips forming the seal extend in vertical direction.

FIG. 4 shows an arrangement according to which the seal forming strips are connected to the lower portion of the building opening.

The seal according to the present invention consists primarily of a plurality of parallel flap-like strips the effective length of which is at least 10 times greater than the thickness thereof. The strips which have a rectangular or nearly rectangular plan view are clamped-in at their shorter edges. These strips which are easily deformable may be arranged in one plane. Preferably, however, they are arranged in two planes superimposed upon each other in such a way that the gap between adjacent strips of one plane is overlapped by the strips of the other plane.

If the seal according to the invention is employed, for instance for openings in buildings up to which vehicles to be loaded or unloaded are moved, a deformation of the strips occurs when the respective vehicle moves in to the opening in the building. The strips will deform and will engage the outer surface of the vehicle while the desired sealing effect results. When the vehicle moves away from the building, the strips will return automatically to their original position.

Figure 2:
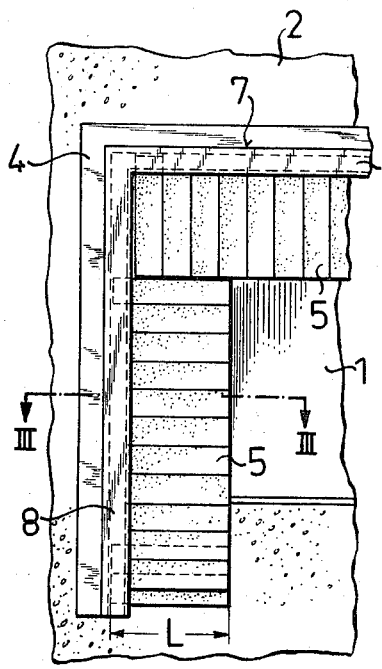
FIG. 2 shows a portion of the front side of the seal according to FIG. 1.

Referring now to the drawing in detail, the building 2 has firmly connected thereto holding means of steel sheet metal generally designated 4 or the like which holding means protrude from the front wall of the building 2 and comprise a horizontal part 7 located closely above the upper edge of the opening 1 and a vertical part 8 arranged on each side of the opening 1 (only one vertical part being shown in FIG. 2) so that the holding means 4 form a frame which is open toward the bottom. This frame extends in downward direction beyond the lower end of the opening 1. The parts 7 and 8 are arranged directly adjacent the wall portions defining the opening 1. The sealing means proper are connected to the foremost marginal portions of the holding means. The sealing means are formed by narrow lamellae-like strips 5 which are arranged in two layers or planes adjacent to each other and consist of rubber or a rubberlike material so that they can easily bend and can easily elastically be deformed. When relatively long strips 5 are employed, they may be reinforced by embedded reinforcements.

Such reinforcement is, by way of example, shown in FIG. 3 and designated with the character $x$. More specifically, the reinforcement may consist of a textile fabric insert 50 having embedded therein wires or wire strands 51 which preferably form an upper and a lower layer 52 and extend parallel to each other in any position. The said wires or wire strands extend similar to the insert 50 practically over the length of the strips 5. The strips 5 are vertically suspended on the horizontally extending part 7 and are arranged horizontally on the vertical part 8.

The strips 5 may have, for instance, a length L of from 30 to 150 cm and a width of from 5 to 20 cm. The thickness of the strips 5 may, for instance, be from 0.5 to 1.5 cm. These dimensions, however, may, of course, be adapted to the particular circumstances involved.

Figure 1:
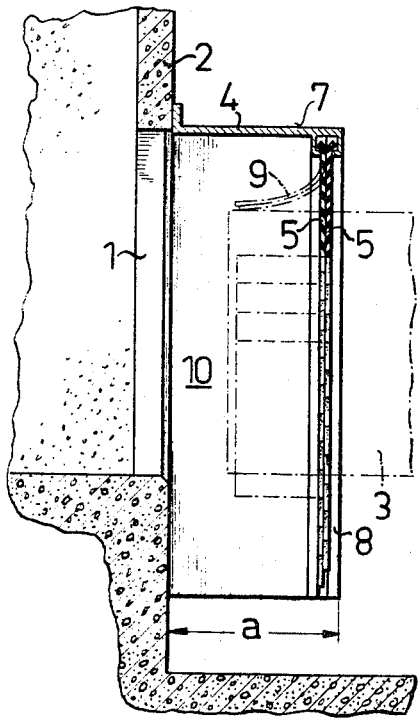

When the strips are in their non-deformed condition, they are located substantially in one plane which is parallel to the front side of the building 2. If now a vehicle 3 is moved in front of the opening 1, the superstructure of the vehicle will engage the free ends of the unilaterally clamped-in strips 5 and will bend the same toward the opening 1. In this condition, the strips 5 may occupy, for instance, the position indicated in dash lines in FIG. 1 and designated with the reference numeral 5'. It will be appreciated that the strips 5 will, due to their elastic property, engage the outer surface of the vehicle 3. A sealing of the gap toward the bottom is generally not necessary because the gap 10 is covered up by a loading ramp. In case of the employment of individual parallel strips 5, only those strips take part in the sealing which are deformed by the superstructure of the vehicle.

According to FIG. 3, the free end of the holding means 4 has an approximately C-shape while forming a longitudinal groove 15 with a free entrance width B. At those ends of the holding means 4 which face each other, the strips 5 are held by metallic profiles 20 the length of which is slightly greater than the width of the strips 5. The holding of the strips 5 is effected by clamping them between the surfaces 21 and the prongs 21' of the profiles 20. However, it is possible to displace the profiles 20 in the longitudinal groove 15. The surfaces 21 for each two opposite strips form a V with each other. If the two strips 5 are not located adjacent to each other in the central plane 16 or if the strips 5 are not yet arranged in pairs in conformity with FIG. 3, the strips 5 will be inclined in conformity with the dash lines 22 shown in FIG. 3. In assembled condition according to FIG. 3, the two adjacent strips 5 will engage each other under elastic tension. In this way, the strips 5 stabilize each other without harmfully affecting the deformability of the strips 5.

In the lower portion of FIG. 4 there is shown how the strips 5 are offset with regard to each other. FIG. 4 furthermore shows the possibility of assembling the strips. The strips 5 shown in the lower portion of FIG. 4 are already in their effective position. If further strips 5 are to be brought into their effective position, the strips 5 or the profiles 20 are successively introduced into the longitudinal groove 15. The strip 5' has already been introduced into the groove 15. The strip 5' is then lowered and introduced at 18 into the respective free space while together with the strip 5 or the pertaining profile 20, which are already in the groove 15, filling out the longitudinal groove 15. In this way, they are secured against accidentally dropping out of the groove. The remaining strips 5 are assembled correspondingly. This way of assembling the strips is possible because the width b of the profiles 20 is slightly less than the entrance width B and because two adjacent profiles 20 nearly fill the longitudinal groove 15 or together have such a total width that this width is greater than the entrance width B.

In order to assure a proper deformation of the strips 5, the holding means 4 should protrude from the building 2 by a distance a which distance exceeds the effective length L of the strips 5. According to FIG. 5, the strips 5 may extend in horizontal arrangement in the manner of a door with two wings and may extend over the width of the opening 1 of the building 2. According to the embodiment of FIG. 6, the strips 5 are arranged vertically (which means they have a length which corresponds to the free height of the opening 1).

According to the embodiments of FIGS. 5 and 6 it is advantageous to arrange the strips in conformity with the showing of FIG. 3 in two planes one above the other in order to press the strips against each other.

Figure 7:
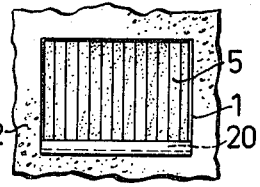

While with the vertical arrangement of the strips in conformity with FIG. 6 the strips are connected to the upper marginal portion defining the opening, according to the embodiment of FIG. 7, which similar to FIGS. 5 and 6 shows an opening in a building in the form of a window, the strips are connected to the lower marginal portion defining the opening in the building. Thus, the strips 5 extend vertically in upward direction. This is possible because the strips 5 in view of the mutual support in conformity with FIG. 3 have a sufficient stability.

It is, of course, to be understood that the present invention is, by no means, limited to the particular showing in the drawing but also comprises any modifications within the scope of the appended claims.

What I claim is:

1. A sealing device for sealing the gap between the marginal portions defining an opening in a building and an object in said opening, which includes holding means defining an opening and being adapted to be connected to the marginal area of wall means defining a similarly sized opening, and a plurality of closely adjacent flexible elastic strip means supported on edge by said holding means and extending horizontally into the area of said opening thereof, said holding means including frame means for connection to a wall and also including holding members slidably arranged in said frame means, said holding members including means for receiving and clamping therein one end of said strip means, said frame means comprising rail means receiving said holding members, and said rail means defining a single groove having a width equalling approximately twice the width of one of said holding members, said holding members being arranged in said rail means in two adjacent rows, said strip means of one row being held by said holding members at an acute angle with regard to the strip means held in the adjacent row by the pertaining holding members.

2. A sealing device according to claim 1, in which the flexible effective length of said strip means connected to said holding means equals at least 10 times the thickness of said strip means.

3. A sealing device according to claim 2, in which said strip means are arranged in two adjacent planes in such a way that the gap between the strip means of one plane is overlapped by the strip means in the other plane.

4. A sealing device according to claim 3, in which said holding means includes U-shaped frame means having the edge portions on one side thereof adapted to be connected to a wall and having the oppositely located edge portions designed to hold and support said strip means.

5. A sealing device according to claim 4, in which the depth of said frame means is in excess of the free flexible length of said strip means.

6. A sealing device according to claim 1, in which said rail means have a C-shaped cross section.

7. A sealing device according to claim 1, in which each of said holders includes clamping means for receiving the strip means therein.

8. A sealing device according to claim 1, in which said strip means in said two rows are held in said holders so as to be elastically pressed against each other.

9. A sealing device according to claim 1, in which the ends respectively include contact surfaces of the strip means of two adjacent rows located in a plane forming a plane of symmetry with regard to the holding members holding the respective strip means.

10. A sealing device according to claim 1, in which the strip means extend releaseably one above the other in an at least approximately horizontal direction.

11. A sealing device according to claim 1, in which said strip means are suspended on said holding means.

12. A sealing device according to claim 1, in which said strip means extend at least approximately in vertical direction and have their lower portion connected to said holding means.

* * * * *